(12) United States Patent
Venkataraman et al.

(10) Patent No.: US 9,325,182 B2
(45) Date of Patent: Apr. 26, 2016

(54) MOUNTING SYSTEM FOR CHARGING EQUIPMENT

(71) Applicant: General Electric Company, Schenectady, NY (US)

(72) Inventors: Ganesh Venkataraman, Plainville, CT (US); John Legato, Plainville, CT (US); Michelle Harmin, Plainville, CT (US); Pradeep Thimma, Plainville, CT (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 653 days.

(21) Appl. No.: 13/684,928

(22) Filed: Nov. 26, 2012

(65) Prior Publication Data

US 2014/0145676 A1 May 29, 2014

(51) Int. Cl.
*H02J 7/00* (2006.01)
*B60L 11/18* (2006.01)

(52) U.S. Cl.
CPC ........... *H02J 7/0042* (2013.01); *B60L 11/1825* (2013.01); *H02J 7/0027* (2013.01); *Y02T 10/7055* (2013.01)

(58) Field of Classification Search
CPC .............................. Y02T 10/7088; Y02T 90/12
USPC ........................................................ 320/104
See application file for complete search history.

(56) References Cited

U.S. PATENT DOCUMENTS

| | | | |
|---|---|---|---|
| 3,217,227 A | 11/1965 | Sherwood | |
| 8,013,569 B2 | 9/2011 | Hartman | |
| 8,994,497 B2* | 3/2015 | Grant et al. | 340/5.73 |
| 2011/0080137 A1 | 4/2011 | Avganim | |
| 2011/0169447 A1 | 7/2011 | Brown et al. | |
| 2011/0174875 A1* | 7/2011 | Wurzer | 235/380 |
| 2011/0285262 A1* | 11/2011 | Heo et al. | 312/237 |
| 2012/0019198 A1 | 1/2012 | Clouser | |

(Continued)

FOREIGN PATENT DOCUMENTS

| | | |
|---|---|---|
| EP | 2371655 | 10/2011 |
| WO | 2007141543 | 12/2007 |
| WO | 2011060020 | 5/2011 |

OTHER PUBLICATIONS

"The Other Coolest Thing in the Garage.", GE Energy, pp. 1-4, Jun. 2011.

(Continued)

*Primary Examiner* — Suchin Parihar
(74) *Attorney, Agent, or Firm* — GE Global Patent Operation; Stephen G. Midgley

(57) ABSTRACT

A surface-mountable electric vehicle charging station is disclosed. The charging station includes a housing, a first mounting member having a first coupling portion and a first locking portion, including a first locking aperture therethrough, and a second mounting member having a second coupling portion coupleable to the first coupling portion to prevent a movement of the housing in one of a first and a second direction. The second mounting member also includes a second locking portion with a latch surface. One of the mounting members is coupleable to the housing, and the other mounting member is coupleable to the mounting surface. A lock member is disposed in the first locking aperture, movable between a first disengaged position and a second engaged position. The lock member cooperates with the latch surface in the second engaged position, to prevent a movement of the housing in a third direction.

13 Claims, 6 Drawing Sheets

(56) References Cited

U.S. PATENT DOCUMENTS

| | | | |
|---|---|---|---|
| 2013/0020996 A1* | 1/2013 | Kirtley et al. | 320/113 |
| 2013/0091907 A1* | 4/2013 | Nishijima et al. | 70/237 |
| 2013/0113425 A1* | 5/2013 | Kauffmann | 320/109 |
| 2013/0169227 A1* | 7/2013 | Tremblay et al. | 320/109 |
| 2013/0181674 A1* | 7/2013 | Tremblay et al. | 320/109 |
| 2013/0234663 A1* | 9/2013 | Kushalappa et al. | 320/109 |
| 2014/0049214 A1* | 2/2014 | Chang et al. | 320/109 |
| 2014/0057468 A1* | 2/2014 | Temmesfeld | 439/133 |
| 2014/0160280 A1* | 6/2014 | Rodr guez et al. | 348/143 |
| 2014/0170880 A1* | 6/2014 | Doi et al. | 439/305 |
| 2014/0300320 A1* | 10/2014 | Nakajima | 320/109 |
| 2014/0353998 A1* | 12/2014 | White et al. | 296/22 |
| 2015/0061594 A1* | 3/2015 | Hockenstrom et al. | 320/109 |

OTHER PUBLICATIONS

"Wattstation™ Wall Mount", User Manual, GE Energy, pp. 1-16, Sep. 2011.

* cited by examiner

MOUNTING SYSTEM FOR CHARGING EQUIPMENT

BACKGROUND OF THE INVENTION

The subject matter disclosed herein relates generally to mounting systems and methods and, more particularly, to mounting systems and methods for charging stations removably coupled thereto.

Electrically powered vehicles, including electric vehicles and plug-in hybrid electric vehicles, include electric motors powered by energy storage devices, such as batteries. Because an energy storage device is depleted of energy as the vehicle is operated, the operator of the vehicle must recharge the energy storage device prior to using the vehicle again.

At least some known vehicle charging stations are provided for use in various environments. Such charging stations are designed to charge electrically powered vehicles, while providing security and protection for components utilized in charging the vehicle. Charging stations include a variety of constructions to hold up to the environments in which the charging stations are installed. For example, various known charging stations are intended to be removably mounted to a substantially vertical solid surface, such as a wall or pole. Maintenance and/or service of such charging stations often involve removal of the charging station from the mounting surface to gain access to components included therein. It would be desirable to provide a low-cost device and system to enable removably mounting a charging station to a solid surface. It would be further desirable to provide such a charging station that is lockable to allow only authorized users to remove the device from the mounting surface.

BRIEF DESCRIPTION OF THE INVENTION

In one aspect, a surface-mountable charging station for use in charging an electrically powered vehicle is provided. An electric vehicle charging station, mountable to a mounting surface, said charging station includes an electric vehicle charging station housing, a first mounting member comprising a first coupling portion and a first locking portion, the first locking portion defining a first locking aperture therethrough. The charging station also includes a second mounting member comprising a second coupling portion configured to be removably coupled to the first coupling portion, and to operatively prevent a movement of said electric vehicle charging station housing in at least one of a first direction and a second direction the second mounting member further comprising a second locking portion defining a latch surface thereon, wherein one of the first and second mounting members is configured to be fixedly coupled to the charging station housing, and the other of the first and second mounting members is configured to be fixedly coupled to the mounting surface. The charging station also includes a lock member configured to be operatively disposed in the first locking aperture and comprises a moveable latching member arranged for movement relative to the latch surface between a first disengaged position and a second engaged position. The moveable latching member is further arranged and disposed to cooperate with the latch surface when in the second engaged position, to operatively prevent a movement of the electric vehicle charging station housing in a third direction.

In another aspect, a mounting system for removably mounting an electric vehicle charging station housing to a mounting surface is provided. The mounting system includes, a first mounting member comprising a first coupling portion and a first locking portion, the first locking portion defining a first locking aperture therethrough. The charging station also includes a second mounting member comprising a second coupling portion configured to be removably coupled to the first coupling portion and to operatively prevent a movement of said electric vehicle charging station housing in at least one of a first direction and a second direction, the second mounting member further comprising a second locking portion defining a latch surface thereon, wherein one of the first and second mounting members is configured to be fixedly coupled to the charging station housing, and the other of the first and second mounting members is configured to be fixedly coupled to the mounting surface. The charging station also includes a lock member configured to be operatively disposed in the first locking aperture and comprises a moveable latching member arranged for movement relative to the latch surface between a first disengaged position and a second engaged position. The moveable latching member is further arranged and disposed to cooperate with the latch surface when in the second engaged position, to operatively prevent a movement of the electric vehicle charging station housing in a third direction.

DETAILED DESCRIPTION OF THE INVENTION

The embodiments described herein relate generally to surface mountable charging stations for charging an electrically powered vehicle. More specifically, the embodiments described herein relate to charging stations having housings configured to be removably coupled to a surface.

Figure 1:
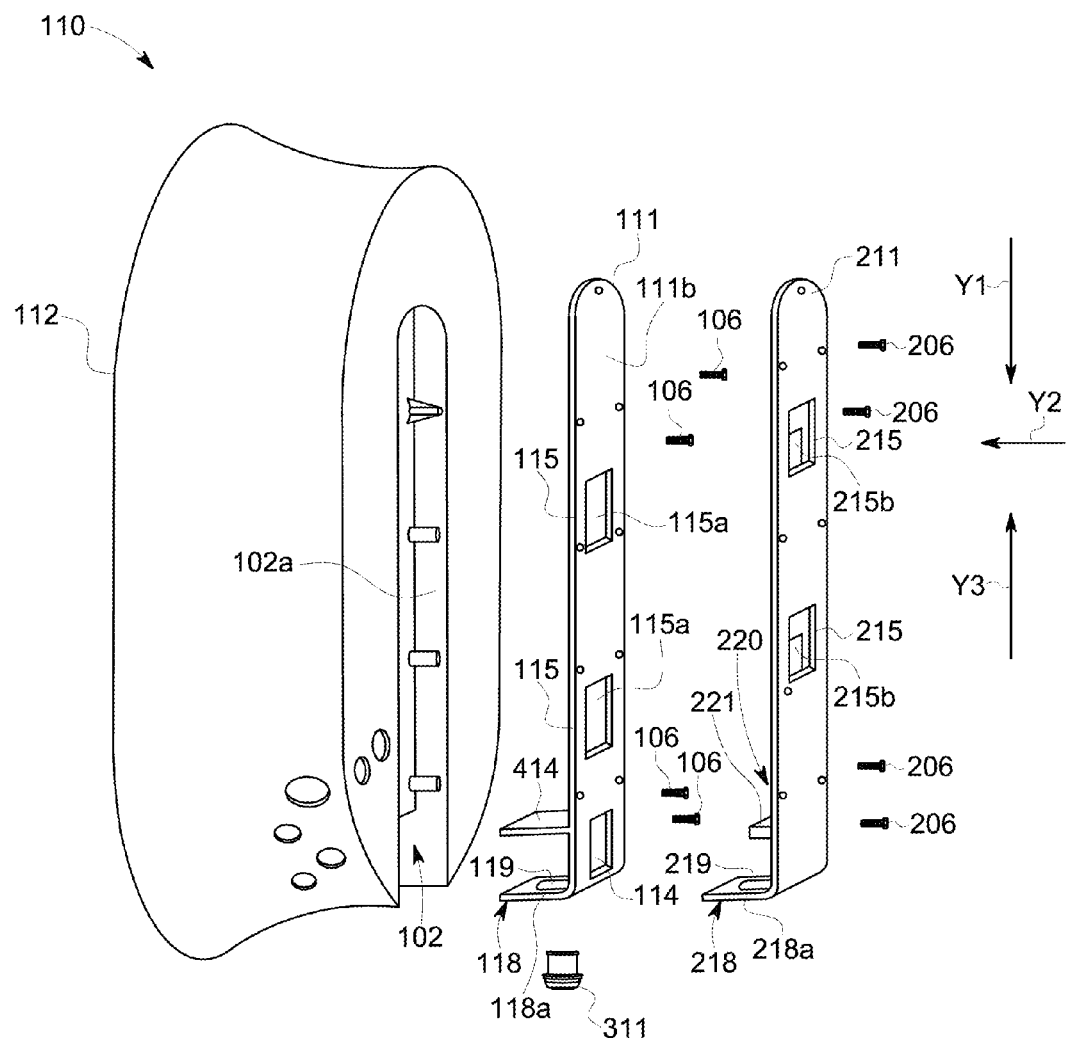
FIG. 1 is a perspective exploded view of an exemplary charging station.

FIG. 1 illustrates an exemplary surface mountable charging station 110 for use in charging an electrically powered vehicle (not shown). In the exemplary embodiment, charging station 110 comprises a housing 112, a first mounting member 111, a second mounting member, 211, and a lock member 311.

In various embodiments, the housing 112 defines an interior 412. Multiple vehicle charging components 437 are positioned within housing 112. Vehicle charging components 437 are well known in the art and may include, without limitation, power conduits, transmission lines, power converters, power conditioners, circuit breakers, switching devices, or other components used to provide energy transfer from charging station 110 to the electrically powered vehicle. Housing 112 is configured to at least, partially enclose vehicle charging components 437 to protect such components from various environmental conditions, such as, for example, weather, debris, insects, and rodents, and/or to inhibit unauthorized access to vehicle charging components.

In an embodiment, housing 112 includes a mounting portion 102 operative to receive at least one of the mounting member 111 and the second mounting member 211. For example, in an embodiment the mounting portion 102 may define a slot 102a sized and disposed to receive a portion of the first mounting member 111. In other embodiments, the slot 102a may be sized and disposed to receive a portion of the second mounting member 211.

In an embodiment, as illustrated in FIG. 1, the first mounting member 111 is configured to be operatively fixedly coupled to the housing 112, and disposed at least partially between the housing 112 and the second mounting member 211. For example, in an embodiment, first mounting member 111 may be substantially planar, and comprise a first mounting member first side 111a, and an opposing first mounting member second side 111b. First mounting member first side 111a is operatively disposed to face housing 112. In an embodiment, first mounting member second side 111b is operatively disposed to face the second housing member 211. In various embodiments, first mounting member 111 may be fixedly coupled to the housing 112 with fasteners 106 such as screws or rivets.

Figure 2:
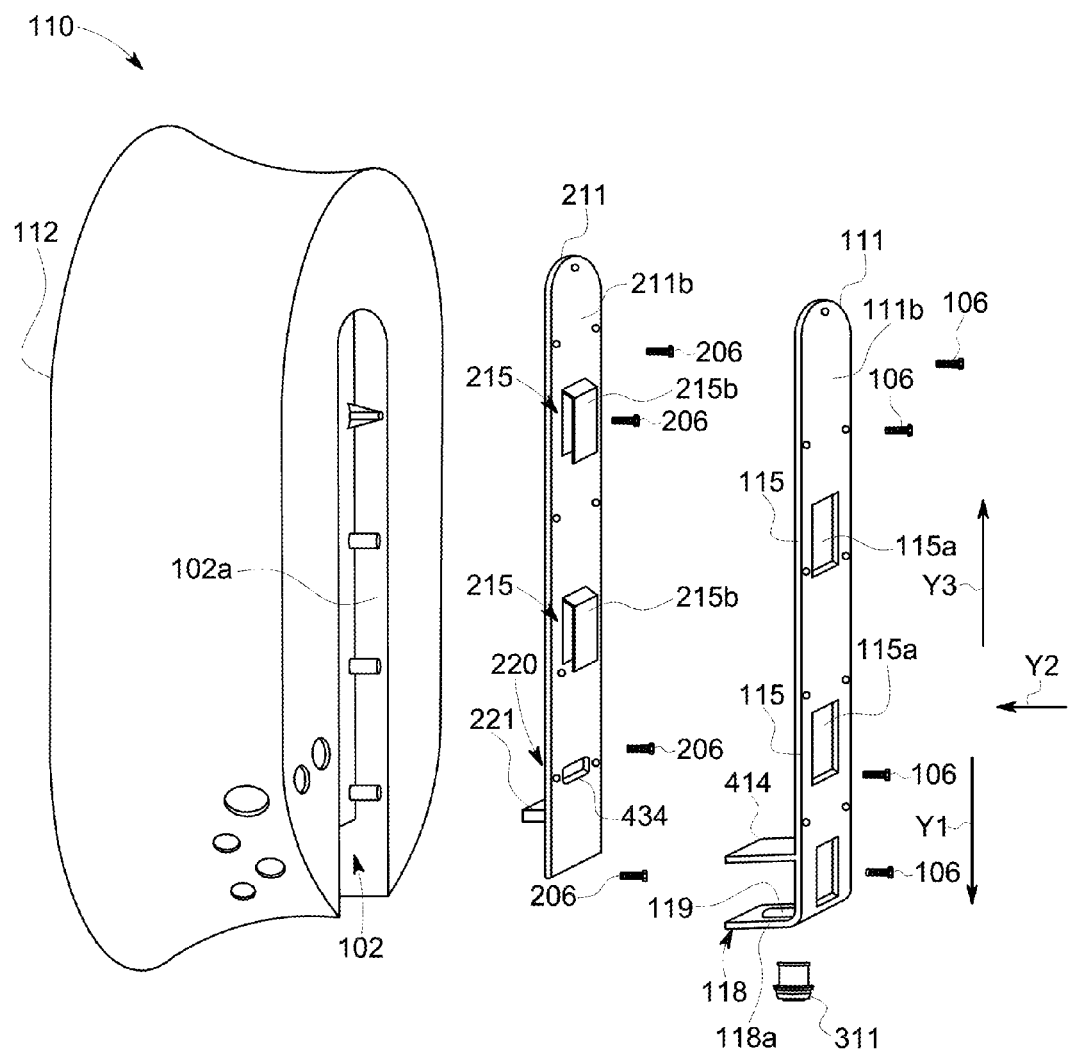
FIG. 2 is a perspective exploded view of an alternative embodiment of a charging station.
Figures 3, 3A:
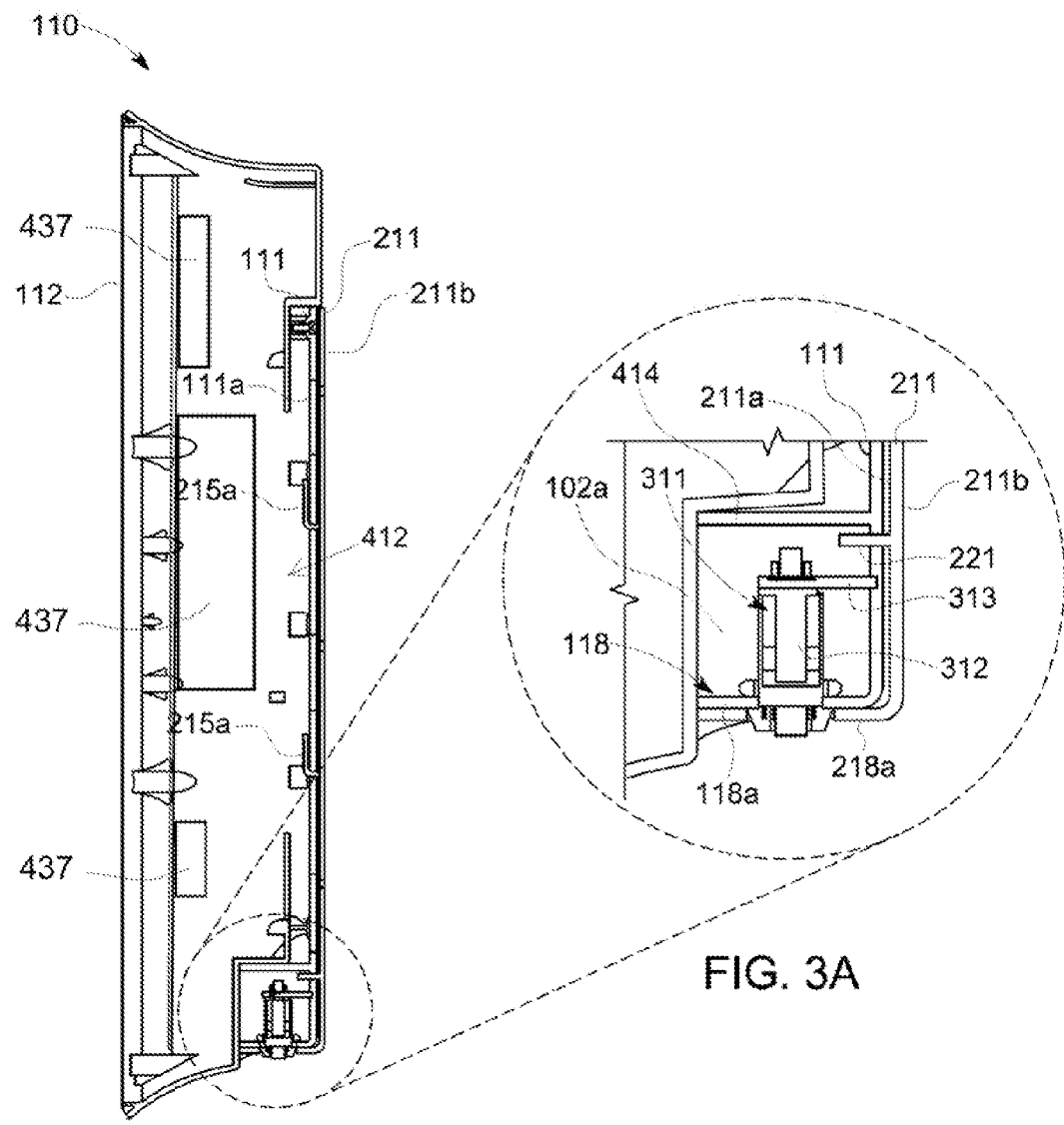
FIG. 3 is a side view cross-section of the charging station of FIG. 1.
FIG. 3a is a detail view of a portion of the charging station of FIG. 3 with the locking member in an engaged position.
Figures 4, 4A:
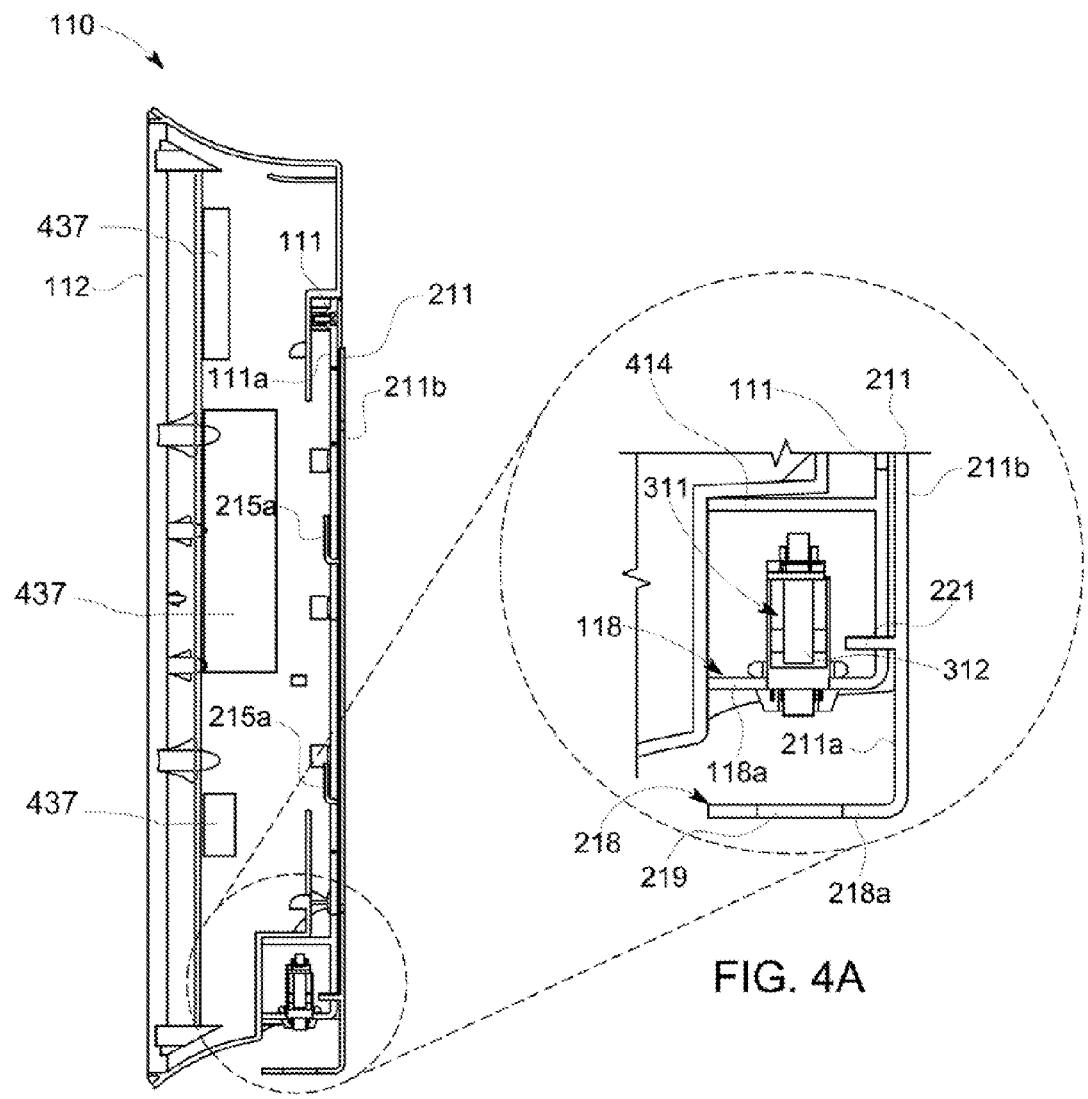
FIG. 4 is a side view of the charging station of FIG. 1.
FIG. 4a is a detail view of a portion of the charging station of FIG. 4 with the locking member in a dis-engaged position.

Alternatively, in another embodiment, as illustrated in FIG. 2, the first mounting member 111 is configured to be operatively fixedly coupled to the desired mounting surface, such as a wall, pole, or any other desired solid surface. For example, in this embodiment, first mounting member 111 may be substantially planar, and the first mounting member first side 111a is disposed to operatively face housing 112, and first mounting member second side 111b is disposed to operatively face the desired mounting surface. In various embodiments, first mounting member 111 may be configured to be fixedly coupled to the desired mounting surface (not shown) with fasteners 206 such as screws or rivets. It is also contemplated that the first mounting member 111 may be operatively disposed against the desired mounting surface, or alternatively, offset from the mounting surface with shims or spacers (not shown).

Referring again to the embodiment of FIG. 1, the second mounting member 211 may be configured to be operatively coupled to the desired mounting surface, such as a wall, pole, or any other desired solid surface. For example, second mounting member 211 may be substantially planar, and comprise a second mounting member first side 211a, and a second mounting member second side 211b. Second mounting member first side 211a is disposed to operatively face housing 112, and second mounting member second side 211b is disposed to operatively face the desired mounting surface. In various embodiments, second mounting member 211 may be configured to be fixedly coupled to the desired mounting surface (not shown) with fasteners 206 such as screws or rivets. It is also contemplated that the second mounting member 211 may be operatively disposed against the desired mounting surface, or alternatively, offset from the mounting surface with shims or spacers (not shown).

Alternatively, as illustrated in the embodiment of FIG. 2, the second mounting member 211 may be configured to be operatively coupled to the housing 112, and disposed at least partially between the housing 112 and the first mounting member 111. For example, the second mounting member 211 may be substantially planar, and the second mounting member first side 211a is operatively disposed to face housing 112. In this embodiment, second mounting member second side 211b is operatively disposed to face the first housing member 111. In various embodiments, second mounting member 211 may be fixedly coupled to the housing 112 with fasteners 106 such as screws or rivets.

In an embodiment, as illustrated in FIG. 1, the first mounting member 111 may comprise a support member 414. For example, the support member 414 may be arranged substantially orthogonal to first mounting member first side 111a. The support member 414 is sized and disposed to cooperate with the housing 112 to prevent a movement of the housing 112 in a first direction Y1. Additionally, in another embodiment, as shown in FIG. 2, the second mounting member 211 may additionally comprise a corresponding support aperture 434 defined therethrough, and sized and disposed to operatively receive the support member 414.

Alternatively, in other embodiments, the support member 414 may be arranged on the second mounting member 211, arranged substantially orthogonal to second mounting member first side 211a, and sized and disposed to cooperate with the housing 112 to operatively prevent a movement of the housing 112 in the first direction Y1. In other embodiments, the first mounting member 111 may additionally comprise the corresponding support aperture 434 defined therethrough, and sized and disposed to operatively receive the support member 414 arranged on the second mounting member 211.

The first mounting member 111 is configured to be releasably coupled to the second mounting member 211. In an embodiment, the first mounting member 111 defines at least one first coupling portion 115, and the second mounting member 211 defines a corresponding at least one second coupling portion 215. In one embodiment, and as shown in FIGS. 1 and 2, the at least one first coupling portion 115 comprises at least one first coupling aperture 115a defined therethrough, and the second mounting portion 215 comprises a corresponding at least one second coupling member 215b defined thereon. The first coupling aperture 115a is sized and disposed to releasably receive the second coupling member 215b, to couple the first and second mounting members 111, 211. In such embodiments, the first coupling aperture 115a and second coupling member 215b are arranged to cooperatively prevent a movement of the housing 112 in at least one of the first direction Y1 or the second direction Y2. In an embodiment, the second direction Y2 is generally orthogonal to the first direction Y1.

In other alternative embodiments (not shown), the at least one first coupling portion 115 may comprise at least one first coupling member 115b (not shown) defined thereon, and the second mounting portion 215 may comprise a corresponding at least one second coupling aperture 215a (not shown) defined therethrough. In such embodiments, the second coupling aperture 215a is sized and disposed to releasably receive the first coupling member 115b, to operatively couple the first and second mounting members 111, 211. In such an embodiment, the first coupling aperture 115a and second coupling member 215b may be arranged to cooperate to prevent a movement of the housing 112 one of the first direction Y1 or the second direction Y2. In an embodiment, the second direction Y2 is generally orthogonal to the first direction Y1.

As illustrated in FIGS. 1 and 2, the first mounting member 111 comprises a first locking portion 118. For example, in one embodiment, the first locking portion 118 comprises a first locking member 118a disposed substantially orthogonal to first mounting member first side 111a. In an embodiment, first locking member 118a comprises a first locking aperture 119 defined therethrough, and sized and arranged to operatively receive the lock member 311.

Figures 5, 5A:
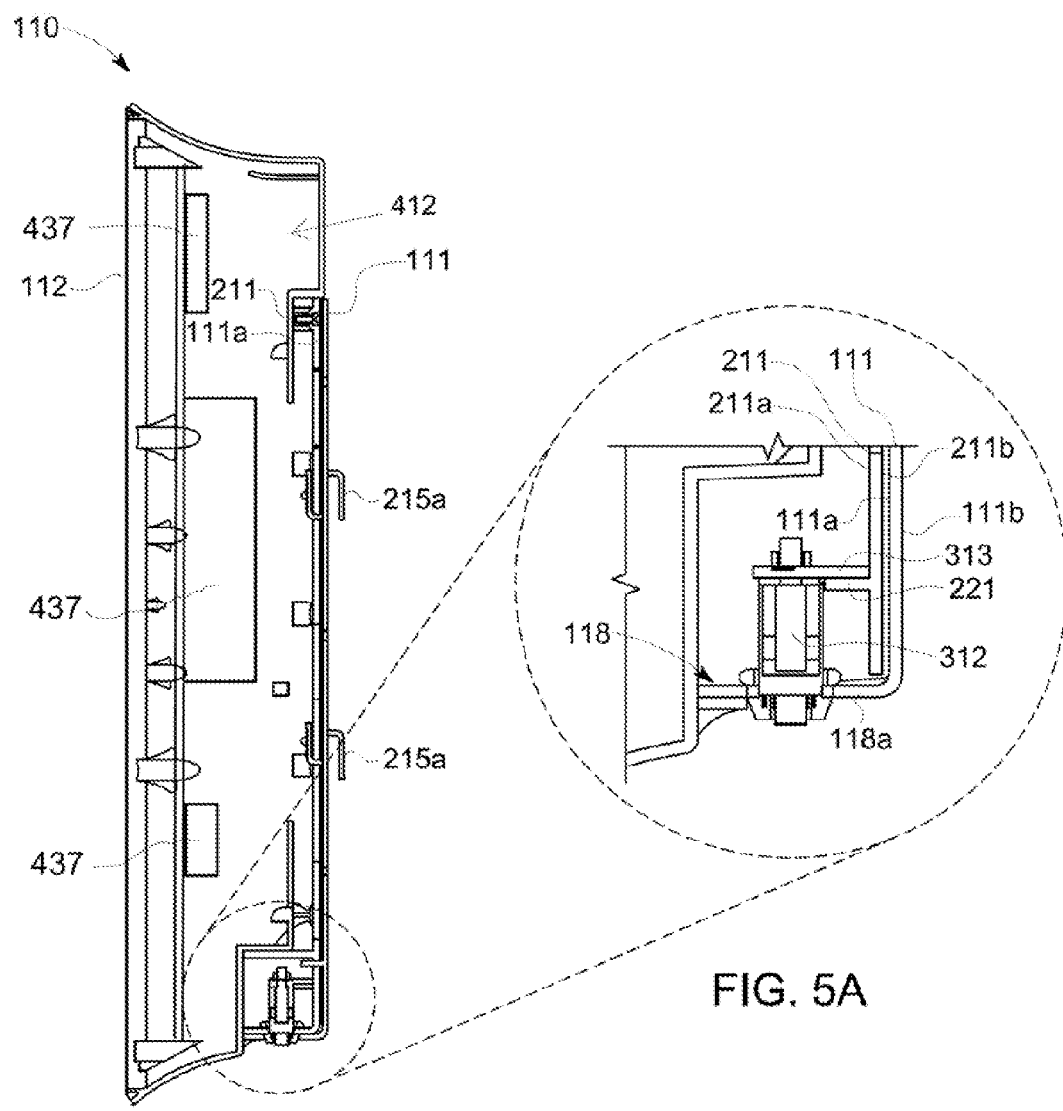
FIG. 5 is a side view cross-section of the charging station of FIG. 2.
FIG. 5a is a detail view of a portion of the charging station of FIG. 5 with the locking member in an engaged position.
Figure 6A:
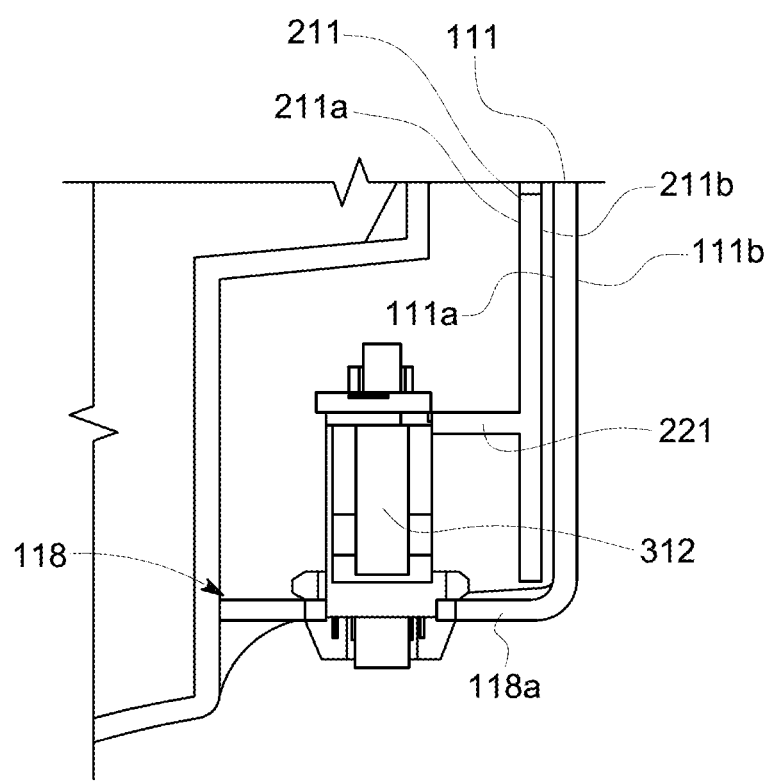
FIG. 6a is a detail view of a portion of the charging station of FIG. 5 with the locking member in a dis-engaged position

In the embodiment as illustrated in FIG. 1, the second mounting member 211 may comprise a second locking portion 218. For example, the second locking portion 218 may comprise a tab 218a disposed substantially orthogonal to second mounting member first side 211a and comprising a second locking aperture 219 defined therethrough. The second locking aperture 219 is sized to allow a user, such as a maintenance technician, operative access to the lock member 311. In another embodiment, second locking aperture 219 is sized and arranged to operatively receive the lock member 311 therethrough. In other embodiments, as illustrated in FIGS. 2 and 5, mounting member 211 may be arranged without the second locking portion 218.

As illustrated in FIGS. 1 and 2, the second mounting member 211 comprises a latching portion 220 defined thereon. For example, in an embodiment, latching portion 220 comprises a latching surface 221 disposed substantially orthogonal to second mounting member first side 211a. As depicted in FIG. 1, the first mounting member 111 may comprise a corresponding latching portion aperture 114 defined therethrough, sized and disposed to operatively receive the latch surface 221. The latch surface 221 is sized and disposed to operatively extend or protrude from the latching portion aperture 114 and to cooperate with at least a portion of the lock member 311 to prevent a movement of housing 112 in a third direction Y3. In an embodiment, the third direction Y3 is generally orthogonal to at least one of the first direction Y1 and the second direction Y2.

In an embodiment, the lock member 311 is configured for operable rotation by a user between the first dis-engaged position and a second engaged position. For example in an embodiment, lock member may comprise a slot (not shown) sized and disposed to receive a tool such as a screwdriver. Alternatively, lock member may be keyed and/or operable by a specialized tool to substantially limit access to only authorized persons. It is contemplated that in various embodiments, lock member 311 may be configured in any number of ways to allow operable rotation relative to the latch surface 221 by a user, manually or with a tool.

The first locking portion 118 is sized and disposed to cooperate with the lock member 311. For example, in an embodiment, the first locking aperture 118a is sized and arranged to cooperatively receive the lock member 311 and allow operative movement of the lock member 311.

As illustrated in FIGS. 3-6a, and in various embodiments, the lock member 311 comprises a movable latch member 313 movable between one of a first dis-engaged position and a second engaged position. For example, in one embodiment, the lock member 311 comprises a generally cylindrical body 312 and the movable latch member 313 is arranged to extend from lock member 311. In one embodiment, the latch member 313 extends substantially orthogonal to the lock member 311. When disposed in the second engaged position, the movable latch member 313 is configured to cooperate with latch surface 221 to prevent a movement of housing 112 in the third direction Y3. For example, in an embodiment, when in the second engaged position, the movable latch member 313 latchably engages the latch surface 221, and thereby prevents movement of the housing 112 in the third direction Y3. Conversely, when in the first dis-engaged position, the latch member 313 does not engage the latch surface 221 and does not prevent movement in the third direction Y3. For example, in an embodiment, the latch member 313, when in the first dis-engaged position, is disposed to allow the movement of the electric vehicle charging station in the first direction In exemplary embodiments, first mounting member 111, the second mounting member, 211, and the lock member 311 may be constructed from rigid material such as plated or stainless steel to provide adequate strength and inhibit corrosion. In other examples, one or more other materials may be used to construct first mounting member 111, the second mounting member, 211, and/or the lock member 311, provided the material(s) is sufficiently rigid and/or stiff to perform as described herein.

In an exemplary embodiment, such as illustrated in FIG. 1, by fixedly coupling second mounting member 211 to the desired mounting surface, and fixedly coupling the first mounting member 111 to the housing 112, the charging station 110 may be easily mounted to the desired mounting surface, and subsequently easily removed for maintenance, without special tools. For example, in an embodiment, the charging station 110 may be mounted to the desired mounting surface for operation by coupling the second mounting member 211 to the housing, for example by using fasteners such as screws, then disposing the housing 112 proximal to the first mounting member 111, aligning the first coupling aperture 115a proximal to second coupling member 215b, and then moving the housing 112 in a first direction Y1 to couple the first coupling aperture 115a and the second coupling member 215b, and thereby operatively coupling the first and second mounting members 111, 211. The locking member 311 is operatively disposed in the first locking portion 118 and may then be rotated by the user to the second engaged position to prevent a subsequent movement of the charging station 110 in the third direction Y3. Conversely, the surface mountable charging station 110 may subsequently be removed from the mounting surface without special tools, such as for maintenance, by rotating the locking member 311 to the first disengaged position and moving the housing 112 in the third direction Y3 operative to de-couple the first coupling aperture 115a and the second coupling member 215b.

Similarly, in other exemplary embodiments such as illustrated in FIG. 2, by fixedly coupling first mounting member 111 to the desired mounting surface, and fixedly coupling the second mounting member 211 to the housing 112, the charging station 110 may be easily mounted to the desired mounting surface, and subsequently easily removed for maintenance, without special tools. For example, in such an embodiment, the charging station 110 may be mounted to the desired mounting surface for operation by coupling the second mounting member 211 to the housing, for example by using fasteners such as screws, then disposing the housing 112 proximal to the first mounting member 111, aligning the first coupling aperture 115a proximal to second coupling member 215b, and then moving the housing 112 in a first direction Y1 to couple the first coupling aperture 115a and the second coupling member 215b, and thereby operatively coupling the first and second mounting members 111, 211. The locking member 311 disposed in the first locking portion 118 may then be rotated by the user from the first dis-engaged position to the second engaged position to prevent a movement of the charging station 110 in the third direction Y3. Conversely, the surface mountable charging station 110 may subsequently be removed from the mounting surface without special tools, such as for maintenance, by rotating the locking member 311 to the first disengaged position and moving the housing 112 in the third direction Y3 to de-couple the first coupling aperture 115a and the second coupling member 215b.

In the above described manner, a user is pen fitted to remove the charging station 110 from the mounting surface and to access the interior of the housing 112 for maintenance or repair. Accordingly, given configuration, size, and/or shape constraints often associated with surface mountable charging station 110, a user is provided with improved access to vehicle charging components within the housing 112, as compared to known charging stations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric, vehicle charging station, mountable to a separate mounting surface, said charging station comprising:
    at least one charging component;
    a housing having said component positioned therein;
    a first mounting member comprising a first coupling portion and a first locking portion, said first locking portion defining a first locking aperture therethrough;
    a second mounting member comprising a second coupling portion configured to be removably coupled to said first coupling portion and to thereby prevent a movement of said housing in at least one of a first direction and a second direction, said second mounting member further comprising a second locking portion defining a latch surface thereon;
    wherein one of said first and second mounting members is configured to he fixedly coupled to said housing, and the other of said first and second mounting members is configured to be fixedly coupled to the mounting surface; and
    a lock member configured to be operatively disposed in said first locking aperture, comprising a moveable latching member arranged for movement relative to said latch surface between a first disengaged position and a second engaged position, said moveable latching member further arranged and disposed to cooperate with said latch surface when in said second engaged position, to operatively prevent a movement of said housing in a third direction.

2. The charging station of claim 1, wherein said latching surface is further arranged and disposed, when in said first dis-engaged position, to allow the movement of said housing in at least one of the first and the second direction.

3. The charging station of claim 1, wherein said first and said second directions are generally opposite each other.

4. The charging station of claim 1, wherein said first mounting member further comprises a coupling aperture, sized and disposed to operatively receive the second locking portion therethrough.

5. The charging station of claim 1, wherein said second latching surface is oriented substantially orthogonal to said second mounting member.

6. The charging station of claim 1 wherein said one of said first and second mounting members is configured to be fixedly coupled to said housing using fasteners.

7. The charging station of claim 1, wherein said other of said first and second mounting members is configured to be fixedly coupled to the mounting surface using fasteners.

8. The charging station of claim 1, wherein said first mounting member further comprises a support member defined thereon sized and disposed to operatively cooperate with said housing to prevent a movement of said housing in said first direction.

9. The charging station of claim 8, wherein said second mounting member additionally comprises a support aperture defined therethrough sized and disposed to operatively receive said support member.

10. The charging station of claim 1, wherein said second mounting member further comprises a support member defined thereon sized and disposed to operatively cooperate with said housing to prevent a movement of said housing in said first direction.

11. The charging station of claim 10, wherein said first mounting member additionally comprises a support aperture defined therethrough sized and disposed to operatively receive said support member.

12. The charging station of claim 1, wherein said first mounting member defines at least one first coupling aperture defined therethrough, and the second mounting member comprises a corresponding at least one second coupling member defined thereon;
    wherein said first coupling aperture is sized and disposed to operatively receive the second coupling member, to couple the first and second mounting members; and wherein
    said first coupling aperture and said second coupling member are arranged to cooperatively prevent a movement of the housing in at least one of the first direction and the second direction.

13. The charging station of claim 1, wherein said electric vehicle charging station housing defines a mounting portion thereon, operative to receive at least one of said mounting member and said second mounting member.

* * * * *